(12) United States Patent
Honda

(10) Patent No.: US 10,126,990 B2
(45) Date of Patent: Nov. 13, 2018

(54) SUPPRESSING A COMPETING ERROR MESSAGE FROM AN OPERATING SYSTEM OR PRINT DRIVER

(71) Applicant: CANON KABUSHIKI KAISHA, Tokyo (JP)

(72) Inventor: Hideki Honda, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/053,831

(22) Filed: Feb. 25, 2016

(65) Prior Publication Data
US 2016/0266849 A1    Sep. 15, 2016

(30) Foreign Application Priority Data
Mar. 12, 2015 (JP) ................. 2015-049971

(51) Int. Cl.
*G06F 3/12* (2006.01)
*H04N 1/00* (2006.01)

(52) U.S. Cl.
CPC ........... *G06F 3/121* (2013.01); *G06F 3/1224* (2013.01); *G06F 3/1229* (2013.01); *G06F 3/1285* (2013.01); *H04N 1/00204* (2013.01); *H04N 1/00411* (2013.01); *H04N 2201/0094* (2013.01); *H04N 2201/3284* (2013.01)

(58) Field of Classification Search
CPC .... G06F 3/121; G06F 3/1229; H04N 1/32539
USPC .............................. 358/1.15, 1.14; 399/8, 9
See application file for complete search history.

(56) References Cited

U.S. PATENT DOCUMENTS

| | | | |
|---|---|---|---|
| 8,675,218 B2 | 3/2014 | Yamada | |
| 8,988,697 B2 | 3/2015 | Kai | ............ G03G 15/5087 |
| 2012/0243017 A1* | 9/2012 | Machida | ............ H04N 1/00503 358/1.13 |

FOREIGN PATENT DOCUMENTS

| | | |
|---|---|---|
| JP | 2008-015947 | 1/2008 |
| JP | 2010-079757 | 4/2010 |
| JP | 2010-086091 A | 4/2010 |

OTHER PUBLICATIONS

Office Action dated Jun. 29, 2018 in counterpart Japan Application No. 2015-049971, together with English translation thereof.

* cited by examiner

*Primary Examiner* — Eric A Rust
(74) *Attorney, Agent, or Firm* — Fitzpatrick, Cella, Harper & Scinto

(57) ABSTRACT

When error occurrence in a peripheral is detected, and a setting file of a printer driver of the peripheral contains information corresponding to the detected error, an error message different from an OS message provided by an operating system is displayed without displaying the OS message.

20 Claims, 7 Drawing Sheets

FIG. 6A

```xml
<DriverEvents xmlns="http://schemas.microsoft.com/windows/2011/08/printing/driverevents" schemaVersion="4.0">
 <DriverEvent eventId="{A04CF0FC-1CEB-4C62-B967-6F0AE5C5F81E}" xmlns="">
  <Transport>USB</Transport>
  <Transport>WSD</Transport>
  <Query>\Printer.Status</Query>
  <Trigger result="\Printer.Status.Summary:StateReason" comparison="EqualTo" value="UserActionRequired">     601
   <StandardMessage resourceId="1000" />
  </Trigger>
  <Trigger result="\Printer.Status.Summary:StateReason" comparison="EqualTo" value="MediaJam">             602
   <StandardMessage resourceId="'2000'" />
  </Trigger>
  <Trigger result="\Printer.Status.Summary:StateReason" comparison="EqualTo" value="MediaEmpty">           603
   <StandardMessage resourceId="3000" />
  </Trigger>
  <Trigger result="\Printer.Status.Summary:StateReason" comparison="EqualTo" value="InkEmpty">             604
   <StandardMessage resourceId="4000" />
  </Trigger>
 </DriverEvent>
</DriverEvents>
```

FIG. 6B

```xml
<DriverEvents xmlns="http://schemas.microsoft.com/windows/2011/08/printing/driverevents" schemaVersion="4.0">
 <DriverEvent eventId="{A04CF0FC-1CEB-4C62-B967-6F0AE5C5F81E}" xmlns="">
  <Transport>USB</Transport>
  <Transport>WSD</Transport>
  <Query>\Printer.Status</Query>
  <Trigger result="\Printer.Status.Summary:StateReason" comparison="EqualTo" value="UserActionRequired">
   <StandardMessage resourceId="1000" DisplayTime="5"/>    605
  </Trigger>
  <Trigger result="\Printer.Status.Summary:StateReason" comparison="EqualTo" value="MediaJam">
   <StandardMessage resourceId="2000" DisplayTime="10"/>   606
  </Trigger>
  <Trigger result="\Printer.Status.Summary:StateReason" comparison="EqualTo" value="MediaEmpty">
   <StandardMessage resourceId="3000" DisplayTime="10"/>   607
  </Trigger>
  <Trigger result="\Printer.Status.Summary:StateReason" comparison="EqualTo" value="InkEmpty">
   <StandardMessage resourceId="4000" / DisplayTime="5">   608
  </Trigger>
 </DriverEvent>
</DriverEvents>
```

FIG. 7

| MESSAGE ID | MESSAGE |
|---|---|
| 1000 | "USER OPERATION IS REQUIRED." |
| 2000 | "PAPER HAS JAMMED." |
| 3000 | "PAPER HAS RUN OUT." |
| 4000 | "INK HAS RUN OUT." |

SUPPRESSING A COMPETING ERROR MESSAGE FROM AN OPERATING SYSTEM OR PRINT DRIVER

BACKGROUND OF THE INVENTION

Field of the Invention

The present invention relates to an information processing apparatus which includes a driver corresponding to a peripheral, a method, and a storage medium which stores a program.

Description of the Related Art

Conventionally, a technique of notifying a user of a message of an error or the like occurred in a peripheral such as a printer is known. Japanese Patent Laid-Open No. 2010-86091 has described a technique of notifying, in addition to displaying fixed data, a unique message according to an environment in which a printer is used at the time of error occurrence.

New printing architecture, namely, a v4 printer driver is introduced from Windows® 8. In new printing architecture, a printer vendor can describe, in a setting file, the status of a printer to be detected such as an out-of-paper error or cover open. When the printer is set in a predetermined state, a notification UI called a toast corresponding to the predetermined state is displayed on an OS screen to prompt user's attention. Further, if the user clicks the toast, then an application for displaying the status associated with the v4 printer driver is launched to provide the user with more detailed information.

However, an OS can also display a toast independently of the above-described toast. If the user clicks this toast, then an OS application called a charm is launched. The OS charm displays general-purpose information of the printer.

That is, two types of toasts, namely, (1) a printer vendor toast and (2) an OS toast are displayed with respect to one error, making the user feel troublesome. Furthermore, information to be obtained may be different depending on which toast the user clicks.

For example, if the user clicks the toast of (1), he or she can obtain detailed information on a state which is occurring in the printer as a print job transmission destination. For example, when the out-of-paper error is occurring, the user can know a method of coping with that error. On the other hand, if the user clicks the toast of (2), he or she can recognize error occurrence itself but cannot obtain detailed information such as the method of coping with the error. Thus, the user cannot know how to cope with the error. Japanese Patent Laid-Open No. 2010-86091 has described that, in addition to a fixed error message, an additional message according to the environment in which the printer is used is displayed but has not described switching to an error message displayed by the OS.

SUMMARY OF THE INVENTION

An aspect of the present invention is to eliminate the above-mentioned problems with the conventional technology. The present invention provides an information processing apparatus which appropriately controls execution of a process dealing with occurrence of the error of a peripheral, a method, and a storage medium which stores a program.

The present invention in one aspect provides an information processing apparatus in which a printer driver of a peripheral can operate, the apparatus comprising: a detection unit configured to detect occurrence of an error in the peripheral; and a display control unit configured to display an error message different from an OS message provided by an operating system without displaying the OS message when a setting file of the printer driver contains information corresponding to the error detected by the detection unit.

According to the present invention, it is possible to appropriately control execution of the process dealing with occurrence of the error of the peripheral.

Further features of the present invention will become apparent from the following description of exemplary embodiments with reference to the attached drawings.

BRIEF DESCRIPTION OF THE DRAWINGS

FIGS. 6A and 6B are views each showing the description of a setting file;

FIG. 7 is a table showing correspondence between message IDs and messages; and

DESCRIPTION OF THE EMBODIMENTS

Figure 1:
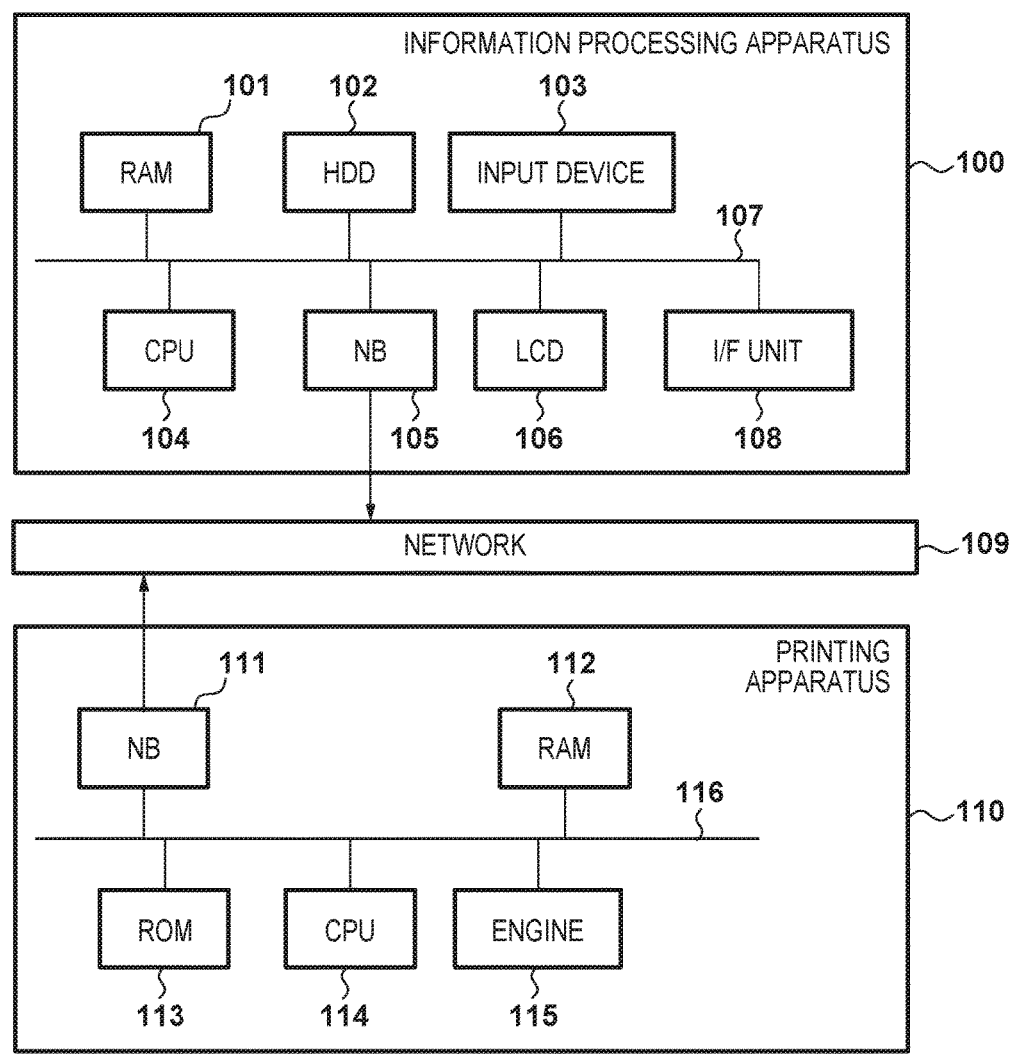
FIG. 1 is a block diagram showing the hardware arrangement of an information processing apparatus and a printer.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

FIG. 1 is a block diagram showing the schematic arrangement of a system. In the system shown in FIG. 1, for example, a general PC is used as an information processing apparatus 100. The information processing apparatus 100 includes a RAM 101, an external storage device (HDD) 102, an input device 103 such as a pointing device or a keyboard, a CPU 104, a network board (NB) 105, a display (LCD) 106, and an interface unit 108. A bus 107 connects the above-described respective blocks so that they can communicate with each other.

The RAM 101 is used as, for example, the work memory of the CPU 104. The external storage device 102 stores an application program group, an OS, a printer driver, and various other data and programs. For example, the program stored in the external storage device 102 is read out to the RAM 101 and executed by the CPU 104, thereby implementing the operation of this embodiment.

The input device 103 accepts a user operation for inputting data or instructing an apparatus operation. The display 106 is used to display the state of the information processing apparatus 100 or a printer connected to the information processing apparatus 100 and accepting an instruction from a user on a screen by a touch panel or the like. The network board 105 performs communication via a network and is connected with a network 109 such as a LAN. Note that the network is not only a wired/wireless network but may be a communication path such as a USB or an infrared ray via the interface unit 108.

The CPU 104 executes the program of the external storage device 102 to display a window and executes various data processing operations in accordance with a cursor on a GUI displayed on the display 106 or a key input by using the keyboard of the input device 103. The CPU 104 implements the software arrangement of the information processing apparatus 100 shown in FIG. 2 and respective processes of a flowchart to be described later by executing the program stored in the external storage device 102.

A peripheral 110 is, for example, a printer and includes a network board 111, a RAM 112, a ROM 113, a CPU 114, and a print engine 115. A bus 116 connects the above-described respective blocks so that they can communicate with each other. Like the network board 105, the network board 111 is connected to the network 109. The ROM 113 stores a control program, data, and the like. The CPU 114 controls the printer 110 in accordance with a control program stored in the ROM 113. The RAM 112 is used not only as the work memory of the CPU 114 but also as a reception buffer which temporarily holds externally received data. The print engine 115 performs printing based on data stored in the RAM 112. The peripheral 110 will be referred to as the printer 110 hereinafter.

In this embodiment, the peripheral 110 is described as the printer. However, the peripheral 110 may be a MultiFunction Peripheral (MFP) which integrates a plurality of functions such as a scan function, a FAX function, and a transmission function.

Figure 2:
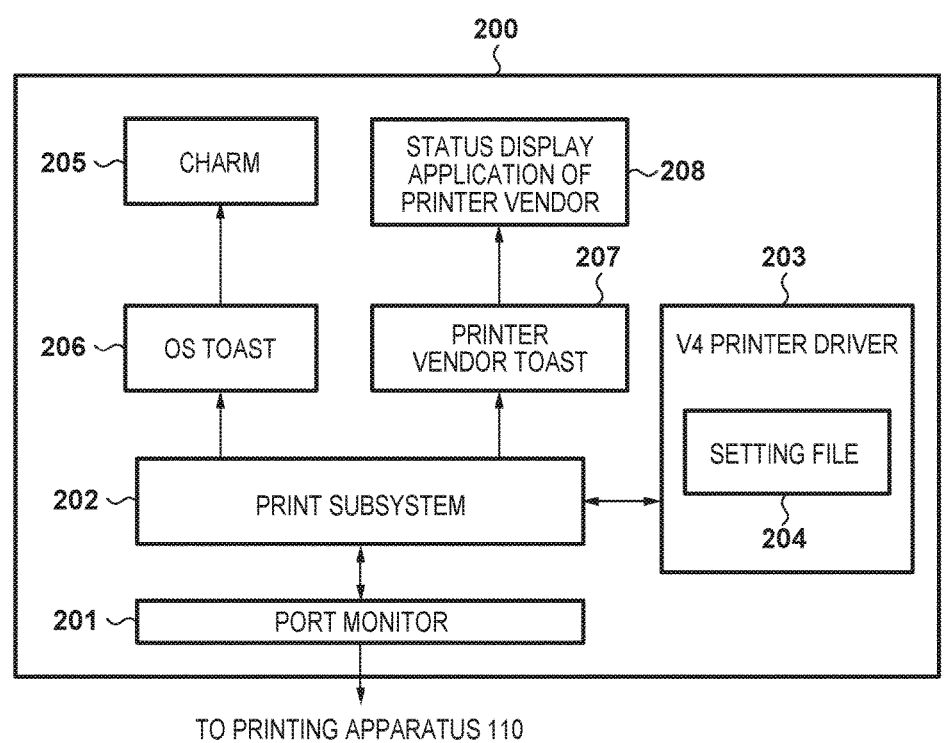
FIG. 2 is a block diagram showing the software module arrangement of the information processing apparatus.

FIG. 2 is a block diagram showing an OS (Operating System) 200 which operates on the information processing apparatus 100 and the module arrangement of software which operates on the OS 200. In this embodiment, a case in which the peripheral 110 is the printer will be described. Therefore, FIG. 2 mainly shows the module arrangement related to print processing. When the peripheral 110 is, for example, a scanner, FIG. 2 shows the module arrangement related to scan processing such as a scanner driver instead of a printer driver. The external storage device 102 stores respective modules of FIG. 2. The respective modules shown in FIG. 2 are loaded into the RAM 101 as needed and executed by the CPU 104 of the information processing apparatus 100.

A port monitor 201 transmits the print job to the printer 110 via the network 109 or acquires status information (state information) of the printer 110 from the printer 110. A print subsystem 202 executes an OS print function. A v4 printer driver 203 is a printer driver used in the OS from Windows 8, and includes a setting file 204. The print job made by the v4 printer driver 203 is transmitted from the print subsystem 202 to the printer 110 via the port monitor 201.

In the setting file 204, the state change of the printer 110 and a corresponding action are associated with each other and, for example, a condition on which the toast is displayed and an ID which identifies a message to be displayed are described. For example, in a BidiExtension file as the setting file 204, which printer statuses are to be assigned to respective schemata is described in association with each other.

Each of toasts 206 and 207 is a notification user interface (UI) called a toast which notifies the user of the state of the printer 110. The toast 206 is provided by the OS 200. On the other hand, the toast 207 is displayed for the v4 printer driver. The display condition and the display contents of the toast 207 are described in the setting file 204. A charm 205 is an application included in the OS to be displayed upon clicking the toast 206. A status display application 208 is displayed upon clicking the toast 207 of the printer vendor. The status display application 208 is also prepared for the v4 printer driver.

Figure 3:
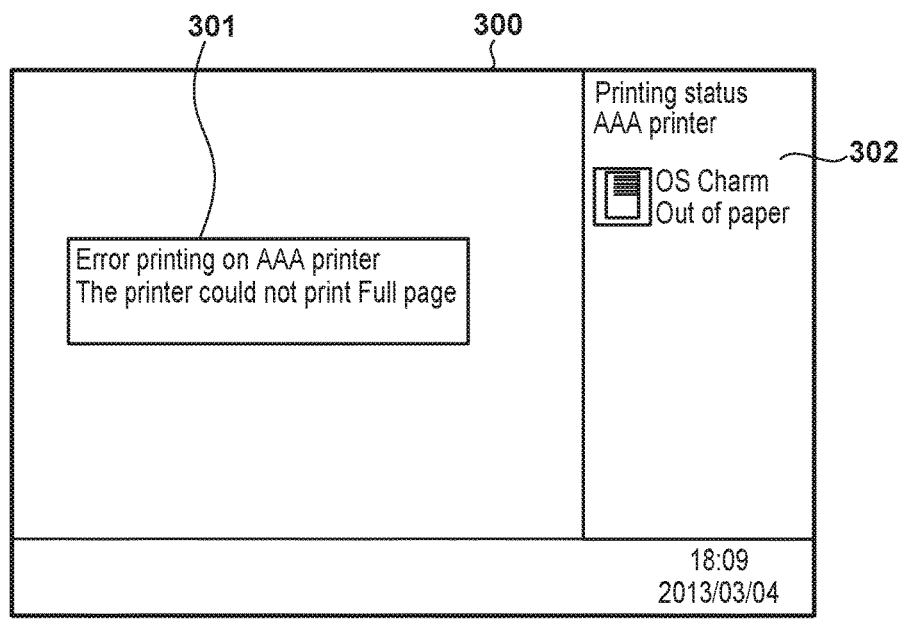
FIG. 3 is a view showing the arrangement of a toast and charm of an OS.

FIG. 3 is a view showing an example of the toast 206 and the charm 205 of the OS 200 displayed on a desktop UI 300 of the OS 200. A display item 301 is the toast 206 of the OS 200. When an error occurs in the printer 110 while printing the print job that has been transmitted by using the v4 printer driver 203, the print subsystem 202 displays the display item 301. A message displayed in the display item 301 is predetermined, and thus the printer vendor cannot customize it to an optimal message in accordance with the type of error that occurs.

A display item 302 is an application included in the OS which is called a charm displayed when the user operates (clicks) the display item 301, and corresponds to the charm 205 of FIG. 2. The display item 302 displays more detailed error contents than the display item 301. The display item 302 can display a general error such as an out-of-paper error that might occur in any printer. However, the display item 302 does not display an error recovery method or the like since it is unique to each printer. In addition, the display item 302 cannot display the contents of a special error which occurs in a specific-purpose printer.

Figure 4:
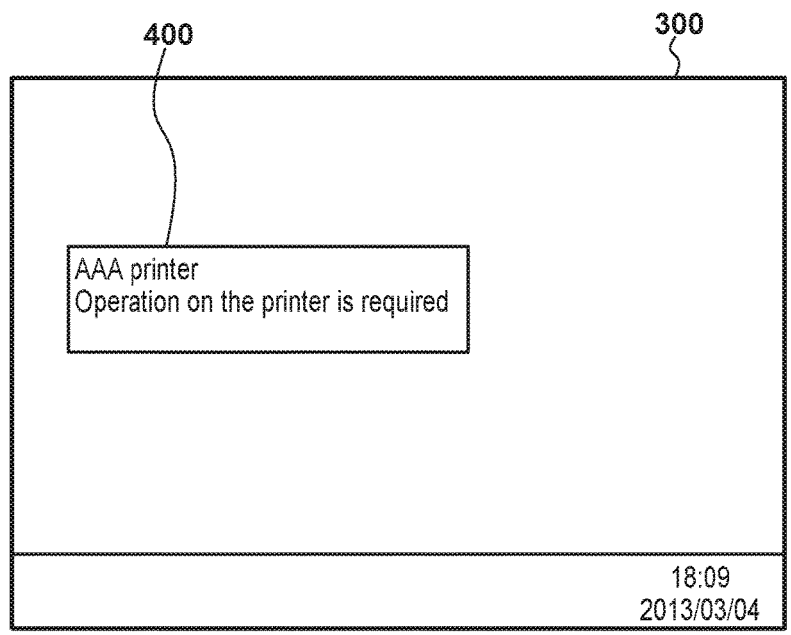
FIG. 4 is a view showing display of a printer vendor toast.

FIG. 4 is a view showing an example of the toast 207 of the printer vendor displayed on the desktop UI 300 of the OS 200. A display item 400 is the printer vendor toast. When an error occurs in the printer 110 while printing the print job that has been transmitted by using the v4 printer driver 203, the print subsystem 202 displays the display item 400. The display item 400 corresponds to the toast 207 of FIG. 2. In the message displayed in the display item 400, the printer vendor can assign a message with the most suitable contents for the printer for each type of errors. The printer vendor defines the correspondence relationship between the error occurred and the display contents of the display item 400. These display message and display condition are described in the setting file 204.

Figure 5:
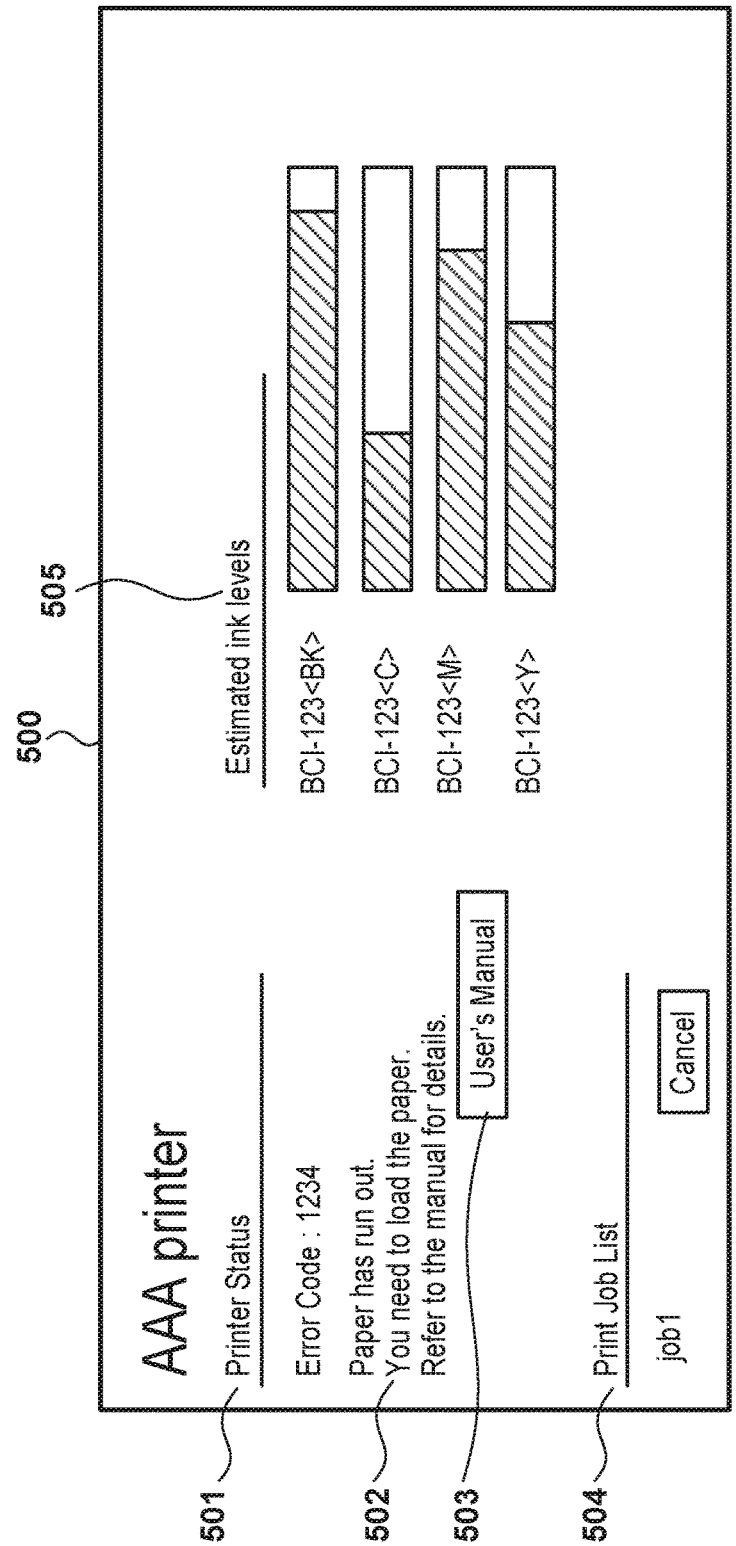
FIG. 5 is a view showing display of a status display application of the printer vendor.

FIG. 5 is a view showing an example of a status display application displayed on the desktop UI 300 of the OS 200. A status display application 500 is displayed upon operating (for example, clicking) the display item 400. The status display application 500 corresponds to the status display application 208 of FIG. 2 and is prepared for the v4 printer driver. The relationship between the v4 printer driver and the status display application 500 will now be described. Some constraints are imposed on a print environment which is provided by the OS described in the present invention. For example, the v4 printer driver is not allowed to perform a process of displaying a screen such as a print setting screen. That is, the v4 printer driver is restricted to perform the process of displaying the screen such as the print setting screen. Therefore, the OS provides the print setting screen. When the user sets more detailed print setting information than the print setting screen provided by the OS, a detailed setting is instructed in the print setting screen of the OS. Upon receiving this instruction, the print setting screen of the status display application corresponding to the selected v4 printer driver is displayed. Note that the print setting screen of the status display application can select more detailed print setting information than the print setting screen provided by the OS. For example, the print setting screen of the status display application also accepts the setting of print setting information with respect to a setting item that cannot be set on the print setting screen provided by the OS. The status display application is installed onto the information processing apparatus synchronously as the v4 printer driver is installed. Then, the v4 printer driver and the status display application are associated with each other by identification information.

Referring back to a description of FIG. 5, a display item 501 displays the status of the target printer 110 as the transmission destination of the print job. That is, the target printer 110 is a printer which transmits error status information that has triggered display of the display item 400 in FIG. 4. In FIG. 5, an error code occurring in the target printer 110 is displayed. A display item 502 displays a message corresponding to the error code. The user can know how to cope with the error occurring by checking this message. A display item 503 is a link button to a user's manual. When the user presses this button, the manual which gives a detailed commentary on the error is displayed. The manual may display manual data locally installed onto the OS 200 or may download and display Web manual data on the Internet.

A display item 504 is a print job list and displays the list of a job executed in the target printer 110. A display item 505 graphically displays estimated ink levels of the target printer 110. FIG. 5 shows, for example, the respective estimated ink levels of cyan (C), magenta (M), yellow (Y), and black (K). When an out-of-ink error occurs, the user can easily determine which ink has run out by checking the display item 505.

FIG. 6A is a view showing an example of contents described in the setting file 204. In FIG. 6A, information as to at what value of the schema indicating the state of the printer 110 the toast 207 is displayed and the message ID of a message displayed at that time are described in association with each other. A description 601 describes that the toast 207 is displayed when the value of the schema "¥Printer. Status. Summary: StateReason" is "UserActionRequired". A description 602 describes that the toast 207 is displayed when the value of the schema "¥Printer. Status. Summary: StateReason" is "MediaJam". A description 603 describes that the toast 207 is displayed when the value of the schema "¥Printer. Status. Summary: StateReason" is "MediaEmpty". A description 604 describes that the toast 207 is displayed when the value of the schema "¥Printer. Status. Summary: StateReason" is "InkEmpty".

On respective conditions of FIGS. 6A and 6B, the message IDs of the messages displayed in the toast 207 are "1000", "2000", "3000", and "4000", respectively, shown in FIG. 7. With these IDs, an optimal message is displayed in accordance with the type of error. FIG. 7 is a table showing the correspondence between the message IDs and the messages. The different message is assigned for each message ID as shown in FIG. 7 and the optimal message is defined in accordance with the type of error.

FIG. 6B is a view showing another example of the contents described in the setting file 204. FIG. 6B is different from FIG. 6A in that a time for which the toast 207 is displayed is further specified for each type of toasts in a format such as DisplayTime="5". Descriptions 605, 606, 607, and 608 describe that the time for which the toast 207 is displayed on the desktop UI 300 of the OS 200 is different depending on the value of the schema "¥Printer. Status. Summary: StateReason". For example, the display time of the toast 207 is 5 sec when the "¥Printer. Status. Summary: StateReason" is "UserActionRequired". The display time of the toast 207 is 10 sec when the "'Printer. Status. Summary: StateReason" is "MediaJam". The display time of the toast 207 is 10 sec when the "¥Printer. Status. Summary: StateReason" is "MediaEmpty". The display time of the toast 207 is 5 sec when the "¥Printer. Status. Summary: StateReason" is "InkEmpty".

Figure 8:
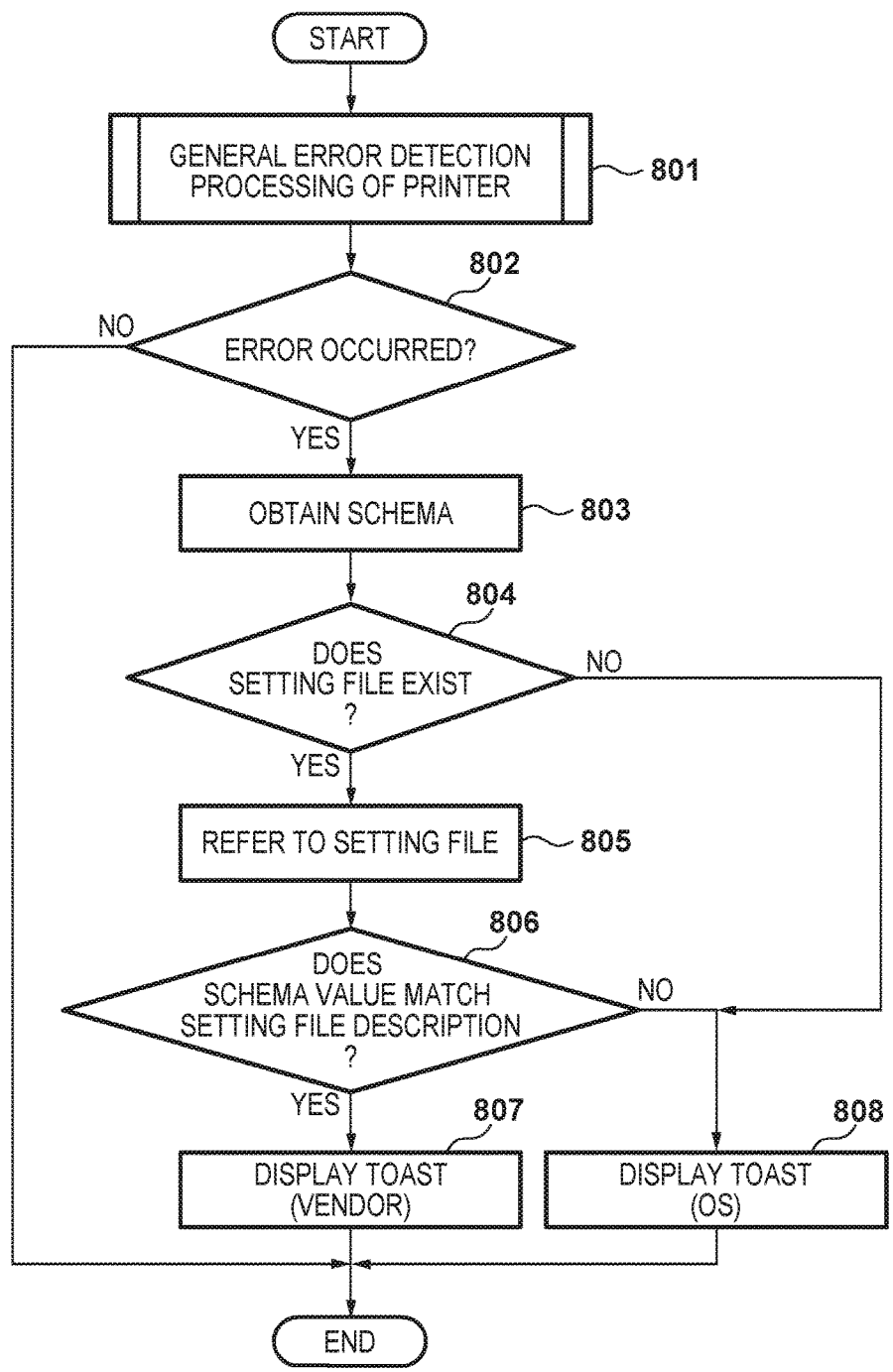
FIG. 8 is a flowchart showing a procedure of toast launch control.

FIG. 8 is a flowchart showing a procedure of toast launch control. The operation of the flowchart in FIG. 8 is implemented by, for example, causing the CPU 104 to read out a program related to the print subsystem 202 of the OS from a memory and execute the program. However, the program may be executed by another module of the OS. The flowchart of FIG. 8 is started when the v4 printer driver transmits the print job to the printer 110. More specifically, the process of FIG. 8 is continuously performed while the print job exists in a print queue of the information processing apparatus corresponding to the printer 110. Note that the print queue is formed in the information processing apparatus by installing the printer driver. When printing is performed by using the printer driver, the print job is transmitted to the printer via the print queue.

The CPU 104 performs error detection processing of the printer 110 (step S801). For example, as described above, the v4 printer driver transmits the print job to the printer 110. When the printer 110 that has received this print job cannot execute the print job normally owing to out-of-paper, out-of-ink, or another error during printing, information indicating that the error has occurred is transmitted to the transmission source of the print job. The CPU 104 determines whether information indicating that the error has occurred is received, thereby implementing step S801. General error detection processing that can be detected without the error code unique to the printer 110 is performed here. For example, when the printer 110 is a USB printer, occurrence of the out-of-paper error can be detected by a GET_PORT_STATUS request defined for a USB printer class.

When the peripheral 110 is a WSD (Web Services for Devices) printer, occurrence of the out-of-paper error can be detected by PrinterStatusConditionEvent defined for the WSD printer. PrinterStatusConditionEvent is an event transmitted from the WSD printer to the OS when the state of the printer changes. The value of "MediaNeeded" is transmitted from the printer to the OS in case of the out-of-paper error. Therefore, error occurrence is detected by detecting that value.

As described above, the CPU 104 can perform error detection processing of the printer 110 by using not the error code unique to the printer 110 but general information defined for the USB printer class and the WSD printer. Besides these methods, a method of determining whether the error is occurring depending on whether print data can be written in the printer 110 may also be used.

In step S802, the CPU 104 determines whether the error is occurring in the printer 110. If the CPU 104 determines that no error is occurring, the process of FIG. 8 ends. On the other hand, if the CPU 104 determines that the error is occurring, the process advances to step S803 in which the CPU 104 obtains the schema of the printer 110.

The schema of the printer 110 is information indicating the state (status) of the printer 110, as described in FIGS. 6A and 6B. As a process of obtaining the schema, for example, the CPU 104 may obtain error information data stored in the storage area of the printer 110 by using the print subsystem 202. Error information data contains identification information indicating the state of the printer.

In step S804, the CPU 104 determines whether the setting file 204 exists. If the CPU 104 determines that no setting file 204 exists, the process advances to step S808. In step S808, the CPU 104 executes display processing of the toast 206 of the OS 200. On the other hand, if the CPU 104 determines that the setting file 204 exists, the process advances to step S805. Note that in the present invention, the CPU 104 determines whether the v4 printer driver includes the setting file 204, thereby implementing step S804. As another method, however, step S804 may be implemented by causing the CPU 104 to determine whether the status display application 208 includes the setting file 204.

In step S805, the CPU 104 refers to the setting file 204. Then, the CPU 104 determines, in step S806, whether a description that matches the schema obtained in step S803 is included in the setting file. If the CPU 104 determines that there is the matching description, the CPU 104 executes display processing of the toast 207 of the printer vendor in accordance with the described contents in step S807. On the other hand, if the CPU 104 determines that there is no matching description, the CPU 104 executes display processing of the toast 206 of the OS in step S808. After processing steps 5807 and S808, the process of FIG. 8 ends. Note that as described above, the process of FIG. 8 is performed repeatedly while the print job exists in the print queue. When the print job is deleted from the print queue upon completion of print job transmission, the process of FIG. 8 ends. Note that, for example, the print job may be deleted from the print queue by receiving a print completion notification from the printer 110 at a timing when the print job is deleted from the print queue.

As described above, in this embodiment, it is decided either of (1) toast display by the toast 207 of the printer vendor or (2) toast display by the toast 206 of the OS 200 is performed for one error. Then, toast display processing of either type decided is executed. As a result, it is possible to prevent the user from feeling troublesome by displaying the plurality of toasts. In this embodiment, it has been described that the printer vendor toast is displayed with priority over the OS toast. However, the present invention is not limited to an arrangement in which a priority-target driver toast (for example, the printer driver toast) is displayed with priority over the OS toast as long as it is given higher priority than the toast set in a portion other than that driver. For example, the priority order may be decided among the drivers corresponding to the different vendors.

In this embodiment, it has been described that the process of the flowchart in FIG. 8 is implemented by causing the CPU 104 to read out the program related to the print subsystem 202 of the OS from the memory and execute the program. However, the process may be implemented by causing the CPU 104 to read out the v4 printer driver 203 from the memory and execute the v4 printer driver. In the case of implementing the process by using the v4 printer driver 203, the process of FIG. 8 is started when the error occurred in the peripheral 110 is provided to the v4 printer driver via the print subsystem 202.

In this embodiment, if the toast 207 of the printer vendor can be displayed, the toast 207 of the printer vendor is displayed with priority over the toast 206 of the OS 200. When the user clicks the toast 207 of the printer vendor, the status display application 208 is launched. The status display application 208 can display a more detailed message about the error than the toast 207. When the user presses, for example, the link button 503 to the user's manual of the status display application 208, the manual about the error occurring is displayed. Note that the manual may be displayed by using the status display application 208 or in a browser launched by operating the link button 503. As a result, the user can acquire more detailed information. It is also possible, by describing the display time longer in advance in the setting file 204, to display the toast that is particularly desired to be seen by the user longer. That is, if both of toast display processing in FIG. 3 and toast display processing in FIG. 4 can deal with one error, the CPU 104 preferentially displays the printer vendor toast in FIG. 4. As a result, detailed information on the error by using FIG. 5 is displayed when the user operates the toast in FIG. 4. More specifically, when the user operates the toast in FIG. 3, the message of "out-of-paper" is only displayed as merely the display item 302.

On the other hand, when the user operates the toast in FIG. 4, the screen of FIG. 5 is displayed. In addition to information that "a paper has run out", information on "replenishment of the paper" is also displayed by this message 502 of FIG. 5. When the display item 503 of FIG. 5 is further selected, more detailed information is displayed. Hence, an information amount displayed based on toast display processing of FIG. 4 is apparently larger than an information amount displayed based on display processing of FIG. 3. Note that more detailed information than display processing of FIG. 3 may be displayed by containing detailed information such as information on "out-of-paper" and "replenishment of the paper", and "a method of replenishing the paper" in the display item 400 corresponding to the toast 207 of the printer vendor in FIG. 4.

The present invention can also be implemented in a process of supplying a program which implements one or more functions of the above-described embodiment to a system or an apparatus via the network or the storage medium, and causing one or more processors in a computer of that system or apparatus to read out and execute the program. Further, the present invention can also be implemented by a circuit (for example, an ASIC) which implements one or more functions.

In this case, a program code read out from the storage medium implements the function of the above-described embodiment by itself, and the storage medium which stores the program code constitutes the present invention. For example, a flexible disk, a hard disk, an optical disk, a magnetooptical disk, a CD-ROM, a CD-R, magnetic tape, a non-volatile memory card, a ROM, a DVD, or the like is usable as the storage medium configured to supply the program code.

The function of the above-described embodiment may be implemented not only by executing the program code read out by the computer but also based on the instruction of that program code. In this case, the present invention also includes a case in which the function of the above-described embodiment is implemented when the OS or the like running on the computer partially or wholly executes actual processing.

Furthermore, the function of the above-described embodiment may be implemented based on the instruction of the program code read out from the storage medium after the program code is written in the memory of a function expansion board inserted into the computer or a function expansion unit connected to the computer. In this case, the present invention also includes a case in which the CPU or the like of the function expansion board or the function expansion unit partially or wholly executes actual processing and the function of the above-described embodiment is implemented by that processing.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)m), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-049971, filed Mar. 12, 2015, which is hereby incorporated by reference herein in its entirety.

What is claimed is:

1. An information processing apparatus in which a printer driver of a peripheral device can operate, the apparatus comprising:
   a communication interface by which an operation of the peripheral device is initiated and by which error information is received, wherein the error information corresponds to an operation error that has occurred in the peripheral device;
   a display on which a selected message is displayable, the selected message being selected from a first operating system message provided from an operating system and a first print message;
   a storage medium for storing computer-executable instructions; and
   at least one processor for execution of the computer-executable instructions stored in the storage medium such that:
      in a case where the first operating system message is selected, a second operating system message is displayed, and in a case where the first print message is selected, a second print message is displayed,
      in a case where the printer driver has information corresponding to the error information received by the communication interface, the first print message is displayed without displaying the first operating system message, and
      in a case where the printer driver does not have the information corresponding to the error information received by the communication interface, the first operating system message is displayed without displaying the first print message.

2. The apparatus according to claim 1, wherein execution of the computer-executable instructions by the at least one processor further comprises:
   a determination of whether a setting file of the printer driver contains the information corresponding to the error information,
   wherein in a case where said determination determines that the setting file of the printer driver contains the information corresponding to the error information, the first print message is displayed without displaying the first operating system message.

3. The apparatus according to claim 2, further comprising a determination of whether the printer driver includes the setting file,
   wherein in a case where said determination determines that the printer driver includes the setting file, it is determined whether the setting file of the printer driver contains the information corresponding to the error information.

4. The apparatus according to claim 1, wherein a status display application screen, containing the second print message, associated with the first print message is displayed by selecting the first print message.

5. The apparatus according to claim 4, wherein an accessory application screen containing the second operating system message is displayed by selecting the first operating system message.

6. The apparatus according to claim 5, wherein the status display application screen displayed by operating the first print message includes an error recovery method which is not included in the accessory application screen displayed by selecting the first operating system message.

7. The apparatus according to claim 1, wherein, in a case where the error occurs in the peripheral device while a print job that has been transmitted by using the printer driver is being printed, the display displays the first print message.

8. A method performed in an information processing apparatus in which a printer driver of a peripheral device can operate, the method comprising:
   initiating an operation of the peripheral device via a communication interface to the peripheral device;
   receiving error information corresponding to an operation error that has occurred in the peripheral device, wherein the error information is received via the communication interface; and
   displaying, on a display unit, a message selected from a first operating system message provided from an operating system and a first print message,
   wherein, in a case where the first operating system message displayed by the display unit is selected, a second operating system message is displayed, and in a case where the first print message displayed by the display unit is selected, a second print message is displayed,
   wherein, in a case where the printer driver has information corresponding to the received error information, the first print message is displayed without displaying the first operating system message,
   wherein, in a case where the printer driver does not have the information corresponding to the received error information, the first operating system message is displayed without displaying the first print message.

9. The method according to claim 8, further comprising determining whether a setting file of the printer driver contains the information corresponding to the error information, wherein in a case where it is determined that the setting file of the printer driver contains the information corresponding to the error information, the first print message is displayed without displaying the first operating system message.

10. The method according to claim 9, further comprising determining whether the printer driver includes the setting file, and
   determining whether the setting file of the printer driver contains the information corresponding to the error information in a case where it is determined that the printer driver includes the setting file.

11. The method according to claim 8, wherein a status display application screen, containing the second print message, associated with the first print message is displayed by selecting the first print message.

12. The method according to claim 11, wherein an accessory application screen containing the second operating system message is displayed by selecting the first operating system message.

13. The method according to claim 12, wherein the status display application screen displayed by operating the first print message includes an error recovery method which is not included in the accessory application screen displayed by selecting the first operating system message.

14. The method according to claim 8, wherein, in a case where the error occurs in the peripheral device while a print job that has been transmitted by using the printer driver is being printed, the first print message is displayed.

15. A non-transitory computer-readable storage medium storing a program that causes a computer in which a printer driver of a peripheral device can operate to function to:
   initiate an operation of the peripheral device via a communication interface to the peripheral device;
   receive error information corresponding to an operation error that has occurred in the peripheral device, wherein the error information is received via the communication interface; and
   display, on a display unit, a message selected from a first operating system message provided from an operating system and a first print message,
   wherein, in a case where the first operating system message displayed by the display unit is selected, a second operating system message is displayed, and in a case where the first print message displayed by the display unit is selected, a second print message is displayed,
   wherein, in a case where the printer driver has information corresponding to the received error information, the first print message is displayed without displaying the first operating system message,
   wherein, in a case where the printer driver does not have the information corresponding to the received error information, the first operating system message is displayed without displaying the first print message.

16. The medium according to claim 15, wherein it is determined whether a setting file of the printer driver contains the information corresponding to the error information
   in a case where it is determined that the setting file of the printer driver contains the information corresponding to the error information, the first print message is displayed without displaying the first operating system message.

17. The medium according to claim 16, wherein it is determined whether the printer driver includes the setting file, and
   in a case where it is determined that the printer driver includes the setting file, it is determined whether the setting file of the printer driver contains the information corresponding to the error information.

18. The medium according to claim 15, wherein a status display application screen, containing the second print message, associated with the first print message is displayed by selecting the first print message.

19. The medium according to claim 18, wherein an accessory application screen containing the second operating system message is displayed by selecting the first operating system message.

20. The medium according to claim 19, wherein the status display application screen displayed by selecting the first print message includes an error recovery method which is not included in the accessory application screen displayed by operating the first operating system message.

* * * * *